(No Model.)

F. E. BYERLY.
MOLDING CUTTER AND HEAD THEREFOR.

No. 487,402. Patented Dec. 6, 1892.

WITNESSES:
N. E. Paige
A. J. Zahn

INVENTOR:
Frank E. Byerly
by Meegans
atty

THE NORRIS PETERS CO., PHOTO-LITHO., WASHINGTON, D. C.

UNITED STATES PATENT OFFICE.

FRANK E. BYERLY, OF PHILADELPHIA, PENNSYLVANIA.

MOLDING-CUTTER AND HEAD THEREFOR.

SPECIFICATION forming part of Letters Patent No. 487,402, dated December 6, 1892.

Application filed April 14, 1892. Serial No. 429,240. (No model.)

*To all whom it may concern:*

Be it known that I, FRANK E. BYERLY, a citizen of the United States, residing at Philadelphia, in the county of Philadelphia and State of Pennsylvania, have invented certain new and useful Improvements in Molding-Cutters and Heads Therefor and the Method of Making the Same; and I do hereby declare the following to be a sufficiently full, clear, and exact description thereof as to enable others skilled in the art to make and use the said invention.

This invention relates to rotating cutters for woodworking and specially to that class of cutters fixed upon and rotating with the end of an arbor for producing rosettes and counterborings in wood required for the ornamentation of joiner and cabinet work and embraces both the cutter-head and also the cutters and the means of securing the one to the other.

This invention consists in a series of two or more cutters produced by turning a steel block or blocks to the proper profile of section, dividing or separating said blocks, beveling the cutting-edges, and hardening and tempering the cutters so formed and attaching them adjustably to inclined surfaces upon a cutter-head having guiding-grooves of an evolute form arranged to present the cutting-edges of the bits and to preserve a clearance back of the edges, and also in combination with the said cutting-bits and head-scoring bits adjustably fitted and clamped in the cutter-head for making a better finish of the circumferential angle of the counterbore.

This invention involves the method of making as well as the construction of the cutters, and is hereinafter fully described, and illustrated in the accompanying drawings, in which—

Figure 1:
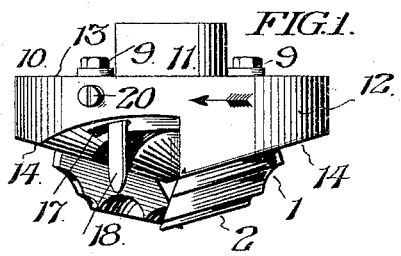
Figure 2:
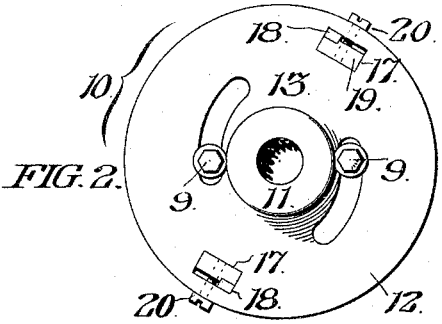
Figure 3:
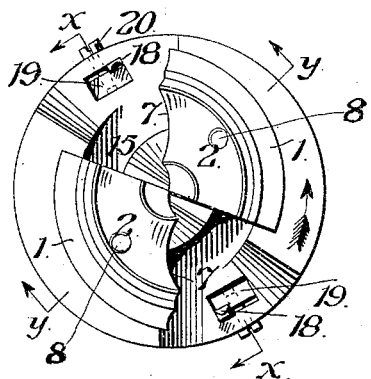
Figure 4:
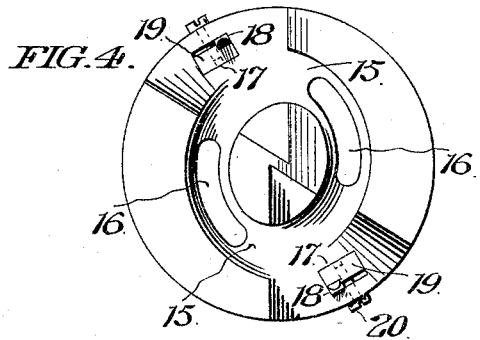
Figure 5:
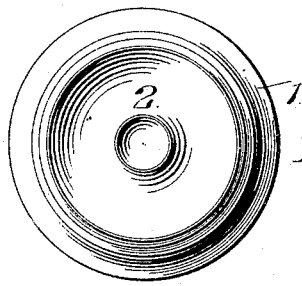
Figure 6:
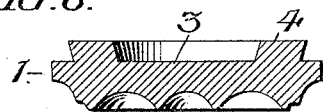
Figure 7:
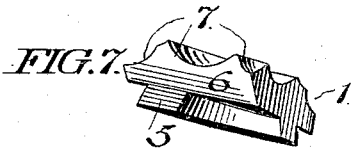
Figure 8:
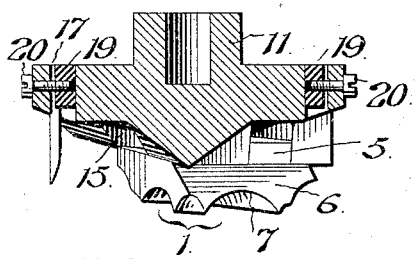
Figure 9:
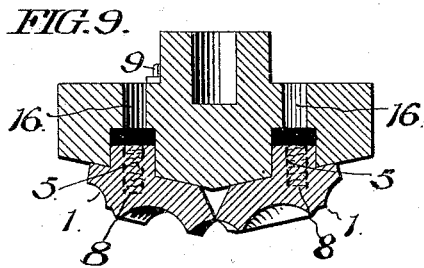

Figure 1 shows an elevation of a cutter-head and cutters embodying this invention; Fig. 2, a plan thereof; Fig. 3, an inverted plan thereof; Fig. 4, an inverted plan of the cutter-head with the cutters removed; Fig. 5, a plan of the face-cutters as turned before separation; Fig. 6, a vertical section thereof; Fig. 7, a detached perspective view of one of the face-cutters; Fig. 8, a vertical section in the plane indicated by the dotted line *x x* in Fig. 3, and Fig. 9 a section in the plane indicated by the dotted line *y y* in Fig. 3.

The face-cutters (marked 1 1) are formed from a circular block of steel or of steel segments clamped together, with the joint centrally located, so as to form a circular block, and they are then turned, in the form shown in Figs. 5 and 6 upon an axis passing through the joint or plane of division, the face 2 being in shape a counterpart of the surface of the rosette or intended counterbore and the back a flat plane 3 with an annular ridge 4 concentric with the circles of the face 2, which ridge 4 when divided forms, as hereinafter explained, the keels 5 for guiding and holding the cutters 1 1 in proper position in the cutter-head. The beveled surfaces 6 are then shaped upon the cutters, so as to form cutting-edges 7 at the acute angle on the face. Holes 8 are then drilled in the keels 5 and screw-threaded or tapped to fit screws 9 for holding the bits 1 1 to the cutter-head. The bits are then hardened and tempered in the usual manner and finally sharpened on the cutting-edges by grinding and honing the beveled surfaces 6, taking care not to grind the central corners away from the axis.

The cutting-head 10 consists of a shank 11 or other convenient mode of attachment to the end of a revolving arbor, a cylindric body 12, having a flat upper side 13, and two beveled surfaces 14, against which the flat backs of the face-cutters 1 1 rest, so that the cutting-edges 7 project beyond the other portions of the face 2. Clearances or spaces for discharging chips are left between the bevels 14. Two opposite evolute grooves 15 are cut in the beveled surfaces 14, which are arcs of a circle of the same radius as the keels 5 on the cutters 1 1, but are not concentric with the axis of the cutter-head, but with radii intersected by said axis, into which grooves the keels 5 are accurately fitted. The evolute direction of the grooves 15, combined with keels 5 of the cutters 2, causes the cutters 2 to have a clearance on their circumferences and to preserve such clearance and present always the same profiles of cutting-edges as they are moved forwardly (in the direction of the arrow marked on them in Figs. 1 and 3) to compensate for the reduction of length by grinding the beveled faces 6 to sharpen the cutting-edges 7. From the grooves 15 are curved slots 16, extending to the upper surface 13 of the cutter-head 10. Through these slots the screws 9, provided with washers under the heads, pass and clamp the cutters 2 2 in proper position on the head 10. Through the head 10 there are rectangular slots 17, in which are fitted scoring-cutters 18, clamped in position by nuts 19, fitting in the slots 17 and drawn against the scoring-cutters 18 by screws 20. The scoring-cutters are located in the path of the outer angles of the cutters 2 2 and are adjusted in radial position by interposing liners between them and the outer sides of the slots 17. By this system of forming cutters the form of the work is not changed as the cutters become worn, a proper angle of clearances and cutting-edges are maintained, and uniformly-smooth work results therefrom. By combining scoring-cutters with the face-cutters thus constructed the outer margin of the counterbores may be always cut smoothly and the chips of the face-cutter freely discharged without undue wear on the angles of the face-cutter. The scoring-cutters being of cheap and easy production and sharpening and adjustment, as compared with the face cutters, an economy of maintenance results. I am aware that molding-cutters have been made of segments of rings previously turned to appropriate profiles. Such cutters I do not claim; but, Having described this invention and the mode of making and using the same, what I claim is—

1. Improved molding-cutters consisting of segments turned to a counterpart of the desired face-molding, embracing parts of the center or core and provided with concentric keels upon the reverse side, in combination with beveled cutting-edges extending from the periphery to the axis of rotation, substantially as set forth.

2. In an end-cutting molding-cutter, beveled circular segments having face profiles corresponding in form to the molding and provided with concentric keels upon the back and with beveled cutting-edges extending from the center of rotation to the periphery, in combination with a cutter-head having oblique surfaces adapted to support said cutters, evolute guides adapted to hold and guide said cutters, and a holding mechanism arranged to clamp said cutters to said cutter-head, substantially as and for the purpose set forth.

3. Segmental cutters having turned clearances and beveled cutting-edges extending from their axis of rotation to their periphery, in combination with guiding-keels concentric with said turned faces, arranged to operate as set forth.

4. A cutter-head having beveled surfaces, as described and shown, in combination with evolute guides adapted to hold segmental cutters having concentrically-turned front surfaces and guiding-keels, as set forth and shown.

5. The segmental face-cutters having turned clearance-surfaces, turned guiding-keels concentric with said clearance-surfaces, and a cutter-head having beveled surfaces and evolute guides, in combination with scoring-cutters adjustably inserted in said cutter-head, as set forth and described.

FRANK E. BYERLY.

Witnesses:
ALEX. H. SIEGEL,
C. R. MORIAN.